United States Patent [19]
Springer et al.

[11] Patent Number: 5,534,659
[45] Date of Patent: Jul. 9, 1996

[54] APPARATUS AND METHOD FOR TREATING HAZARDOUS WASTE

[75] Inventors: Marlin D. Springer, Huntsville; William C. Burns, Harvest; Thomas Barkley, Ardmore, all of Ala.

[73] Assignee: Plasma Energy Applied Technology Incorporated, Huntsville, Ala.

[21] Appl. No.: 229,016

[22] Filed: Apr. 18, 1994

[51] Int. Cl.$^6$ ................................................ A62D 3/00
[52] U.S. Cl. ...................... 588/227; 588/205; 588/225; 204/157.15; 204/157.3; 204/158.20; 110/346; 422/186.21; 422/186.23
[58] Field of Search .................... 588/205, 227, 588/225; 204/157.15, 157.3, 158.2; 110/346; 422/186.21, 186.23

[56] References Cited

U.S. PATENT DOCUMENTS

| | | | |
|---|---|---|---|
| 3,779,182 | 12/1973 | Camacho | 110/8 |
| 3,841,239 | 10/1974 | Nakamura . | |
| 4,181,504 | 1/1980 | Camacho | 48/197 |
| 4,438,706 | 3/1984 | Boday et al. | 110/238 |
| 4,479,443 | 10/1984 | Faldt et al. | 110/346 |
| 4,508,040 | 4/1985 | Santen et al. | 110/347 |
| 4,615,285 | 10/1986 | Bentell | 110/346 |
| 4,644,877 | 2/1987 | Barton | 110/250 |
| 4,770,109 | 9/1988 | Schlienger | 110/247 |
| 4,831,944 | 5/1989 | Durand | 110/346 |
| 4,896,614 | 1/1990 | Kulkarni | 110/346 |
| 4,980,092 | 12/1990 | Pineau et al. | 252/632 |
| 4,989,522 | 2/1991 | Cline et al. | 110/250 |
| 4,998,486 | 3/1991 | Dighe et al. | 110/346 |
| 5,010,829 | 4/1991 | Klukarni | 110/346 |
| 5,065,680 | 11/1991 | Cheetham | 110/342 |
| 5,090,340 | 2/1992 | Burgess | 110/346 |
| 5,095,828 | 3/1992 | Holden et al. | 110/250 |
| 5,108,708 | 4/1992 | Dummersdrof | 422/186.3 |
| 5,127,347 | 7/1992 | Cheetham | 110/347 |
| 5,134,946 | 8/1992 | Poovey | 110/346 |
| 5,143,000 | 9/1992 | Camacho | 110/250 |
| 5,280,757 | 1/1994 | Carter et al. | 110/346 |
| 5,319,176 | 6/1994 | Alvi et al. | 219/121.59 |

FOREIGN PATENT DOCUMENTS 0330872   6/1989   European Pat. Off. .

OTHER PUBLICATIONS

Municipal Solid Waste Feasibility of Gasification with Plasma ARC, Environmental Analyses, presented to EPRI Symposium Industrial Applications of Plasma, Palo Alto, CA, Mar. 7–9, 1990.

*Primary Examiner*—John Niebling
*Assistant Examiner*—C. Delacroix-Muirheid
*Attorney, Agent, or Firm*—Dowell & Dowell

[57] ABSTRACT

An apparatus and method suitable for treating hazardous and non-hazardous waste materials composed of organic and inorganic components is disclosed. The apparatus includes a plasma heating system and off-gas processing which converts the waste to benign solids and useful gas.

39 Claims, 3 Drawing Sheets

APPARATUS AND METHOD FOR TREATING HAZARDOUS WASTE

BACKGROUND OF THE INVENTION

This invention relates to the controlled thermal destruction of waste material, and, more particularly, to a method and apparatus for the treatment of hazardous and non-hazardous materials contained in a waste stream composed of organic (carbonaceous) and inorganic materials, such that the processed waste contains no residues that would require subsequent treatment or landfill disposal. The process involves high temperature pyrolysis and controlled gasification of organic materials, and metals recovery and/or vitrification of inorganic materials.

Placing medical and other waste in landfills was until recently the accepted method of disposal. When the consequences of landfill disposal were investigated more closely, public opposition and regulatory pressures restricted the landfill practice and forced the industry to instead employ incineration, the only other technology that was economical and seemed to solve the disposal problem. Incineration proved useful where landfill space was unavailable or too expensive, but it also was subjected to public concern. Eventually, new and more stringent air emission regulations became effective which most incinerators could not meet. Furthermore, those incinerators that have remained in operation leave an ash residue that often fails the E.P.A. toxicity characteristic leaching procedure (TCLP) test, and contains recognizable and potentially hazardous unburned materials.

Most existing medical waste incinerators are based on old technologies and were built during the period of 1960–1990, or before the present stricter regulations became effective. The air pollution control systems on the older designs, as well as the design of the incinerators, are inadequate to meet the present standards.

Although incinerators are somewhat effective for reducing the volume of waste by combustion, the basic nature of medical waste creates substantial problems for them. One of the major problems encountered in using incinerators to combust medical wastes is the heterogeneity of the waste material. This problem prevents the incinerators from maintaining a sufficiently high constant temperature to completely destroy all of the organic material in the waste. Pollutants that plague incinerators include the so-called products of incomplete combustion. For example, a first bag of such waste may be filled with containers of fluids, blood soaked bandages, and sharps (syringes, glass, metal surgical tools and the like), while a second bag may contain mostly plastics, paper, packing material, pads, surgical gowns, rubbers gloves, and the like. These two bags, fed independently into an incinerator, would create totally different combustion conditions. The first bag would quench and cool the combustion process, while the second bag would accelerate and raise temperatures.

During the low temperature cycle, products of incomplete combustion and the reformation of potentially hazardous organic materials, such as dioxin and furan, are much more likely. During the high temperature cycle, particulate, nitrogen oxide and metal oxide emissions increase, and particularly hexavalent chromium, a carcinogen. Shredding waste before feeding it into the combustion vessel would homogenize and mix the waste, but it is generally not acceptable because of the potentially infectious nature of the waste and the inherent problem of disinfecting a shredder having numerous internal components and small confined places where infectious material might collect and escape disinfection. Moreover, many states have laws prohibiting opening bags of infectious waste prior to their final processing.

Compounding the problem of temperature control within incinerators is the batch method of feeding that is commonly used. In this method, a ram system is normally used to push a charge of waste into a combustion chamber. Because the incinerator relies on the waste itself for fuel, as the waste combusts, chamber temperatures vary as the amount of combustible waste in the chamber changes. This problem is especially pronounced at start-up and shut-down. Temperatures also vary with changing feed rates and incinerators operate poorly at reduced feed rates.

It is important to achieve high temperatures because the destruction of inorganic waste components commonly found in medical and other waste streams requires them. Only a few incinerator designs can even reach the high temperatures required to melt stainless steel and borosilicate glass used in laboratories, and these incinerators further require fossil fuel additions to supplement the combustion process.

The destruction of organic waste also requires high temperatures, but instead of simply melting at high temperatures, such waste decomposes and burns if sufficient air is present. The combustion process can be self-sustaining only if enough heat energy is released during the process to cause additional material to decompose. This can be a problem in incinerators, however, and especially when wet and inorganic materials are present in the feed. Under such conditions, it is not possible to maintain a high, continuous operating temperature.

Apparatuses that have used plasma torches to improve on the low and varying temperature problem, have only achieved a partial solution. For example, U.S. Pat. No. 5,280,757 to Carter discloses a ram (or batch) feed system, which causes significant variation in gas flow rates and temperatures, and includes no precautionary measures to hold the exit gas temperature at a safe high level at which reformation of more complex organic compounds is minimal. The off-gas piping of Carter is composed of stainless steel and it leads to a steel cyclone for particulate collection.

The present inventors have determined that cooling gas in a six-foot section of stainless steel pipe causes the gas temperature to drop into a sufficiently low range (i.e., into the approximately 350°–500° C. range) to allow significant reformation of organic compounds, and particularly polycyclic aromatic hydrocarbons (PAH's). Carter discloses the presence of significant levels of PAH's in the emissions data in Table I. The present inventors have determined, then, that even when the gas temperature is sufficiently high and constant in the processing chamber to effect complete dissociation of organic materials, the gas must be maintained at a sufficiently high temperature after it leaves the chamber and until it is rapidly cooled, to reduce the likelihood of organic compounds reforming.

In recent years, public and regulatory attention has focused on the problems associated with the disposal of medical waste generated by hospitals, clinics, medical offices and research facilities. Numerous new technologies have emerged which been offered as solutions to these problems. Most of these new technologies employ disinfection and/or sterilization methods to reduce or eliminate the infectious portion of the waste so that it may be placed in a landfill after treatment. Where landfill space is still affordable, rendering the infectious component harmless, and then disposing of the entire waste stream as non-infectious waste in a landfill has been offered as a partial solution. As the amount of available landfill continues to decrease, however, and public opposition to using landfills increases, an alternative, final, no-landfill solution becomes inevitable.

Furthermore, all of the disinfection and sterilization technologies leave large amounts of residue or waste to deal with after the process is completed.

Also, many waste treatment processes require a strict sorting practice before selected waste items can be treated. Because most of the non-incineration technologies treat only the infectious portion of the hospital's waste, human error inherent in sorting the waste exposes the hospital to liability claims if infectious waste is later discovered in the non-infectious waste destined for landfills. Substantial fines and potential incarceration for repeat offenders in many states has made this a serious problem.

SUMMARY OF THE INVENTION

The present invention has been made in view of the above-explained inadequacies of the known waste treating apparatuses and methods and has as an object to provide a waste processing system and a method for processing a wide variety of waste types and compositions, containing non-uniform amounts and distributions of moisture, while complying with all applicable air and water emission standards and producing no residues that require disposal in a landfill.

It is another object of the invention to provide a waste processing system which is capable of treating unsorted waste.

It is another object of the invention to provide a waste processing system which is capable of maintaining a constant high temperature throughout the waste treatment process so as to destroy all complex organic materials and process the off-gas so as minimize the reformation of complex organic compounds, and melt all inorganic waste material into solid residues which pass EPA TCLP tests and can be recycled or reused.

Additional objects and advantages of the invention will be learned from the detailed description of a preferred embodiment of the invention which follows, and the accompanying drawings, or may be learned by practice of the invention.

To achieve the foregoing objects of the invention, as embodied and broadly described herein, the apparatus for treating waste in accordance with a preferred embodiment of the invention comprises a waste processing chamber. Waste is introduced into the processing chamber at a controlled feed rate, and is heated therein by a plasma arc torch to temperatures up to about 1650° C. so as to convert the organic portion of the waste substantially to a gas comprising hydrogen, carbon monoxide and carbon dioxide, and entrained carbon particulate, and to convert the inorganic component of the waste substantially to molten material. The gas exits the processing chamber as an off-gas at a temperature of at least about 875° C. to 1000° C.

The waste processing system in accordance with the invention removes the molten material from the processing chamber and subsequently cools it to form a non-leachable solid material, and or alternatively a recyclable metal.

The waste processing system in accordance with the invention monitors the amount of carbon particulate entrained in the off-gas and the carbon monoxide/carbon dioxide ratio of the off-gas. When an excessive amount of carbon particulate is detected in the off-gas, an oxidant is injected into the processing chamber in an amount effective to convert a majority of the carbon particulate to carbon monoxide. The amount of the oxidant injected into the processing chamber is under process control so as to simultaneously minimize the formation of carbon dioxide, while maximizing the conversion of carbon to gas.

To prevent the formation of complex organic compounds from the off-gas, the waste processing system in accordance with the invention maintains the temperature of the off-gas above at least about 875° C. until it is cooled rapidly to a temperature below about 150° C. During the cooling of the off-gas, a portion of the particulate is separated from the cooled gas. Further downstream, any acidic gases in the cooled off-gas are neutralized and the remaining portion of the particulate is separated out to form a product gas which comprises substantially hydrogen and carbon monoxide. The separated carbon particulate is introduced into the processing chamber for further processing. The composition of the product gas is continuously monitored so as to determine the effectiveness of the oxidant injections.

The waste processing system in accordance with the invention also provides for the safe feeding of waste materials to the combustion processing chamber. A method and apparatus are disclosed by which waste is isolated from the surrounding environment before being crushed, shredded, mixed and subsequently conveyed for pyrolysis. The waste is fed into a first collection means after which the first collection means is closed to the surrounding environment. The waste is subsequently discharged into a second collection means, after which the second collection means is closed to the first collection means and the surrounding environment. Thereafter the waste is ground and mixed to blend solids and liquids in the waste. The gas from said second collection means is also vented into the processing chamber.

A disinfectant system is also provided to spray disinfectant into the second collection means, with the disinfectant then being conveyed to the processing chamber for destruction.

The invention also utilizes a processing chamber which includes upper, lower and intermediate sections, which are assembled in an airtight construction.

A method of treating waste in accordance with a preferred embodiment of the invention is also described herein.

DETAILED DESCRIPTION OF THE PREFERRED EMBODIMENT

Figure 2:
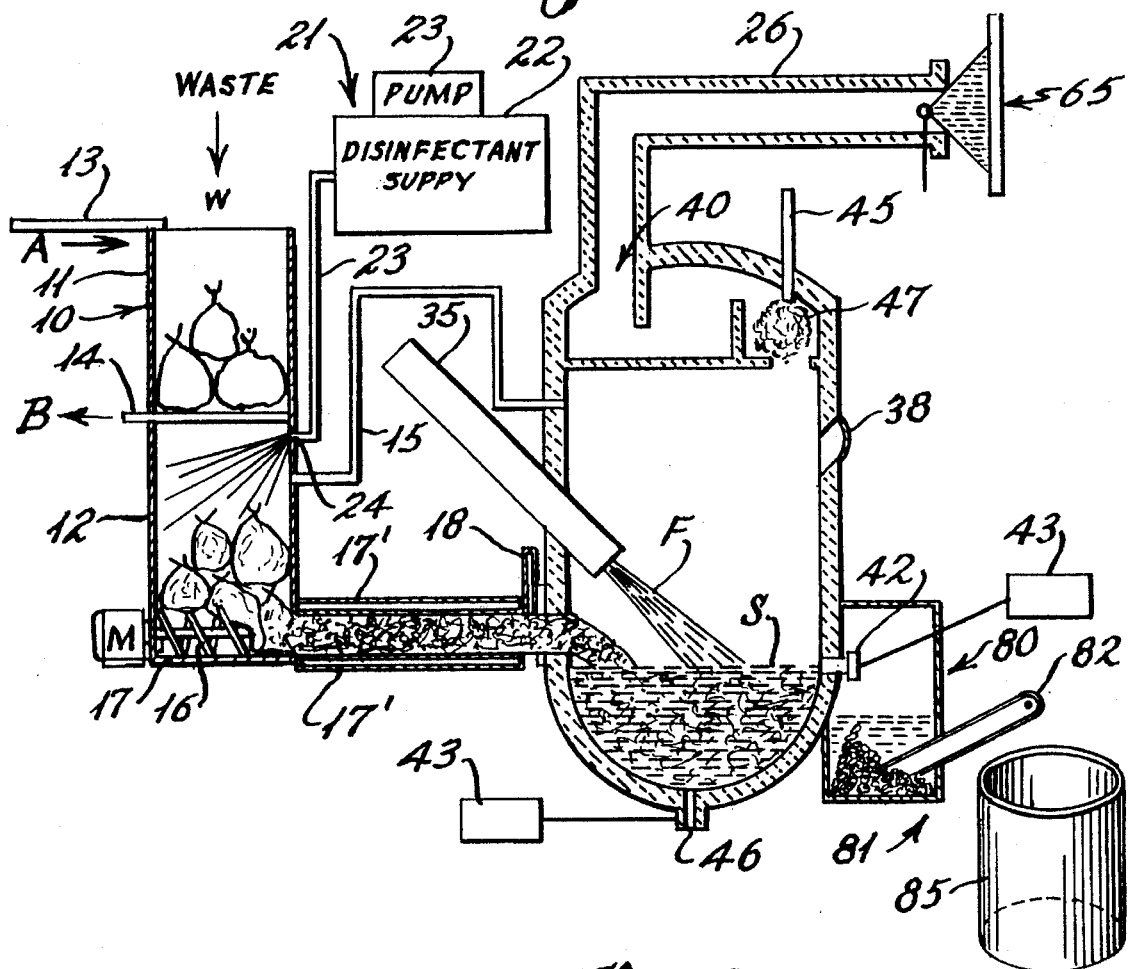
FIG. 2 is an illustrational view of a waste feed system and processing vessel of an apparatus in accordance with the invention.

With reference to the drawing figures, the waste processing system of the invention will be described hereinafter in detail. The system is particularly suitable for treating medical type waste. Referring to FIG. 2, the system includes a waste feed system 10 for feeding medical waste "W" into a waste processing or combustion chamber 20 at a controlled rate. The waste feed system 10 feeds a stream of shredded and compact waste into the processing chamber in a continuous manner. The medical waste may consist of organic and inorganic components and be in the form of solid or liquid material. It may include bags of infectious waste, including blood-soaked sponges, bandages, containers of sharps such as needles, razors, scalpels and other instruments. The system is further capable of processing non-infectious wastes comprised of bags and boxes of office waste, cafeteria waste, facilities maintenance waste such as wooden pallets, oils, grease, discarded light fixtures, yard waste and pharmaceutical waste.

Bags of infectious waste cannot be shredded or mixed before being processed, but some mixing to allow fluid waste to be dispersed and absorbed in the paper and cloth in the waste, is desired. To ensure that adequate mixing occurs, the feed system in accordance with the invention is sufficiently robust to process large metallic and glass containers, and to crush, shred and mix the material as it is fed into the chamber.

The feed system 10 for medical type waste illustrated in FIG. 2 includes a charging hopper 11 positioned directly above a feed hopper 12. An airlock door 13 functions as a sliding cover for the charging hopper. When waste is to be placed in the charging hopper, the door 13 is moved to the opened position as shown. After charging is completed, the door 13 is closed in the direction of arrow "A" to cover the charging hopper. A second, alternately opening, sliding airlock door 14 separates the charging hopper 11 from the feed hopper 12 when in its illustrated closed position. To charge the feed hopper, the door 14 is opened in the direction of arrow "B" while door 13 is closed, so as to prevent the release of any emissions from the feed hopper and the processing chamber into the environment. Each door is provided with appropriate seals which cooperate with seals in the side walls of the charging hopper 11 to prevent any emissions from leaking from the feed system.

A cantilevered conveyor screw or auger 16, driven by a variable speed motor "M", shreds, mixes, compresses and extrudes the waste charge. A feed or conveyor tube 17, which includes a water-cooled jacket 17', surrounds the cantilevered screw and minimizes heat transfer to the feed system. A water-cooled feed tube slide gate 18 is provided at the inlet port of the processing chamber to isolate the feed tube from heat when the feed process is stopped for any significant length of time. The opening and closing of the gate may be automatically controlled.

Figure 1:
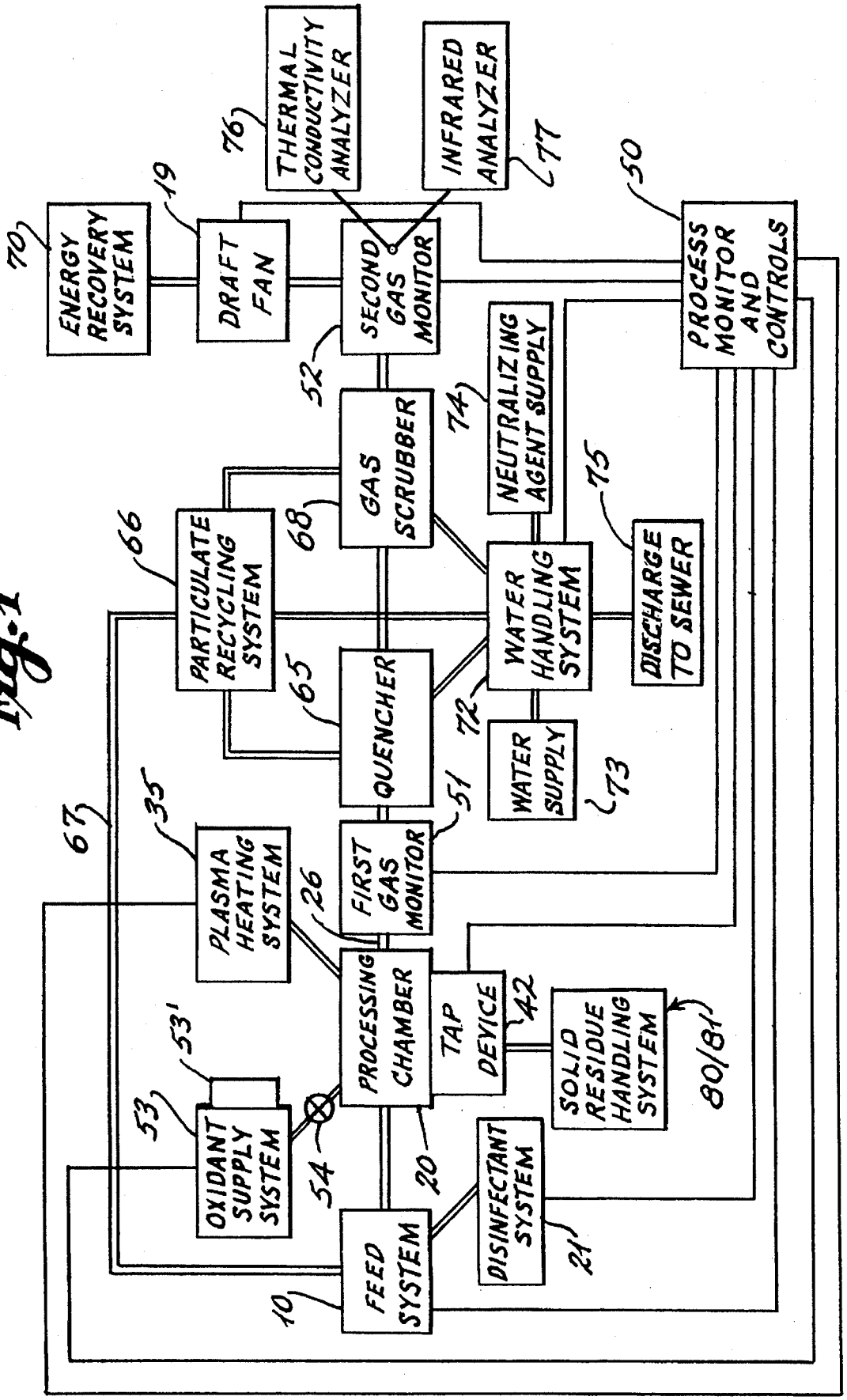
FIG. 1 is a schematic diagram of an apparatus for treating hazardous waste in accordance with a preferred embodiment of the invention.

A vent system 15 is provided between the feed hopper and the processing chamber through which fumes and vapors from the medical waste that are released in the feeding system are drawn into the processing chamber 20 as a consequence of a vacuum pressure being maintained therein by a draft fan 19 disposed downstream (see FIG. 1).

The interior of the feed hopper 12 is relatively open and free of obstructions and contains minimal crevices or cracks in which infectious material can accumulate. This design allows the feed hopper and the cantilevered screw 16, the only moving part in the feed hopper, to be easily disinfected by a disinfectant system 21. The disinfectant system 21 includes a supply container 22 in which an appropriate disinfectant is retained. The preferred disinfectant is a 6% solution of hydrogen peroxide because the solution does not add any new elements, and it contains no chlorine which would have to be later neutralized. The container is connected by supply line 23 to at least one injector nozzle 24 mounted within the feed hopper 12. The disinfectant is pressurized by a pump 25. It is important that the nozzles are arranged to ensure that the entire area within the hopper is subjected to the disinfectant spray so that no toxic or hazardous emissions are encountered when the hopper is opened. After it is applied, the disinfectant drains into the processing chamber and is processed as waste.

During operation, the cantilevered screw 16 forms the liquid and solid waste together into a dense cylindrical plug. The waste is introduced into the processing chamber 20 at a controlled rate so as to expose a controlled amount of surface area of compacted material to the pyrolysis process to regulate the formation of product gases. The feed rate is dependent on the characteristics of the waste and the temperature and oxygen conditions within the processing chamber. The waste is preferably continuously fed into the processing chamber.

In accordance with the invention, the feed rate is initially calculated based on an estimated energy requirement to process the specific waste type being treated. The preferred feed rate is determined by actual operation of the system, and is selected to maintain a preferred average temperature within the processing vessel. A plasma torch 35 described in greater detail hereinbelow, inputs energy into the processing chamber, and the contained waste absorbs the energy in the pyrolysis process. An excessive feed rate maintained for a period of time causes the interior temperature to decrease. Conversely, an inadequate feed rate causes the chamber to overheat. Accordingly, the proper feed rate is selected to achieve the preferred average temperature.

A system in accordance with the invention is capable of processing approximately 1000 pounds of waste per hour, using a 500 kW plasma torch. A system including a torch of about one-half of this power rating and a proportionally smaller processing vessel processes about 500 pounds per hour. It is estimated that these systems are of approximately the necessary size to meet the needs of average sized hospitals. A regional processing center serving numerous hospitals in a large city may use a 1000 kW torch and process up to approximately 25 tons of waste per day.

As the waste material is introduced into the processing chamber, it absorbs energy by convection, conduction and radiation from the plasma flame, the heated refractory lining and the heated gases circulating in the vessel. As the organic portion of the waste material is heated, it becomes increasingly unstable until it eventually dissociates into its elemental components, mainly carbon and hydrogen. Oxygen and the halogens are also liberated if present in the waste. The time required to achieve dissociation varies slightly for different materials, but is typically milliseconds for most compounds at 1100° C. With reference to FIG. 1, the liberated hydrogen gas expands rapidly and flows from the vessel to the off-gas piping 26, carrying with it a portion of any fine carbon particulate generated by the dissociation of the waste.

The known waste treatment apparatuses which use batch feed systems experience surges of released gases when large masses of plastics and other compressible organic materials expand and decompose rapidly in the intense heat. Such surges suddenly generate a large amount of free carbon. The amount of carbon produced is dependent on the amount of organic compounds and available oxygen in the waste. Unless the carbon is oxidized before it exits the processing chamber, an undesirable heavy particulate load is carried downstream into a gas quencher 65 and a gas scrubber 68 (see FIG. 2).

Figure 4:
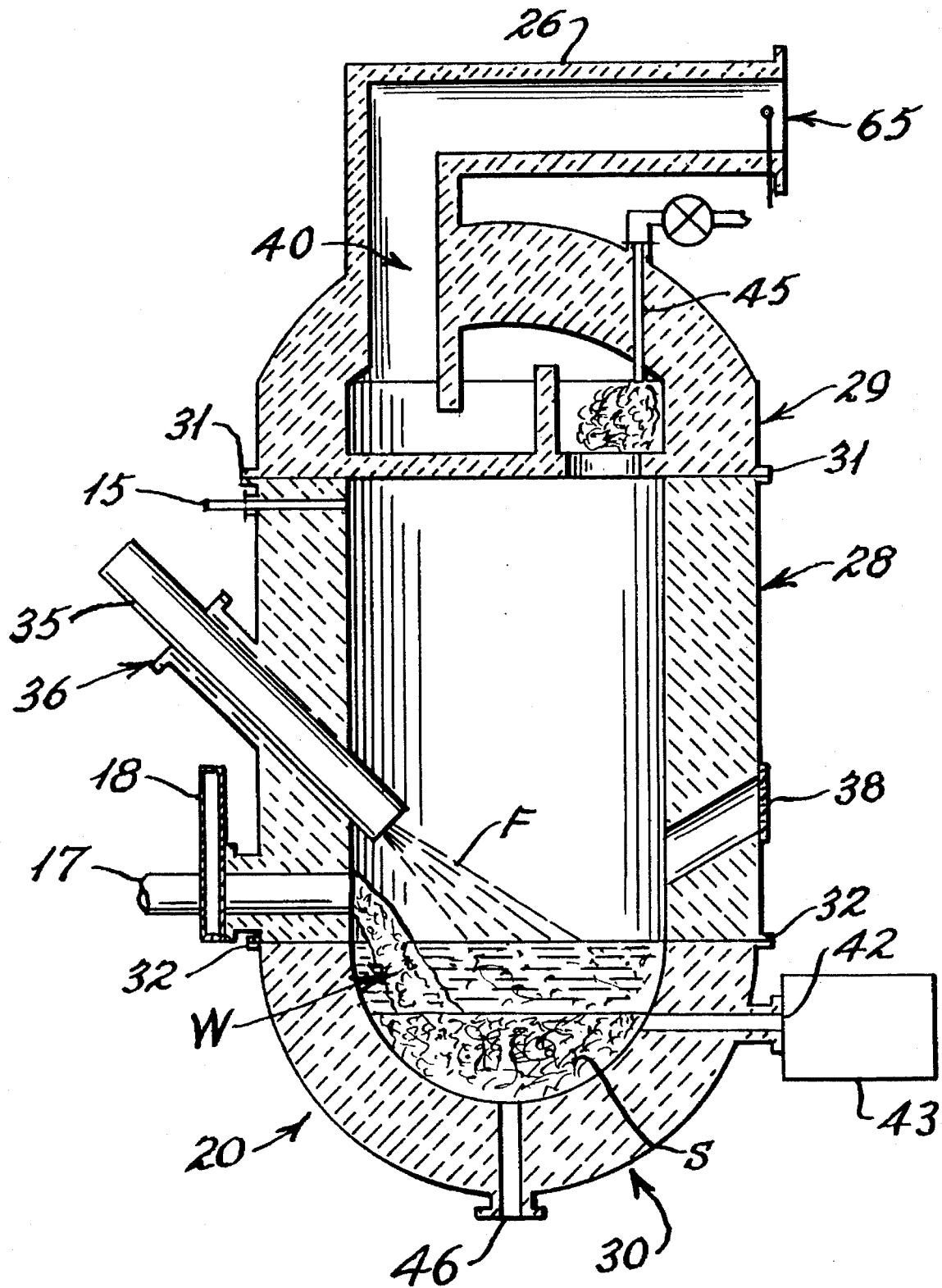
FIG. 4 is a cross-sectional view of the processing or combustion chamber of the invention.

With reference to FIG. 4, the processing chamber 20 is a plasma arc furnace which includes a refractory lined vessel which, in the preferred embodiment, is generally cylindrically shaped and constructed in three sections. The processing chamber is preferably vertically oriented as shown. The vessel is designed to withstand temperatures of up to about 1850° C. in a reducing atmosphere. The vessel includes a central cylindrical section 28, an upper, generally semi-spherical section 29 and a lower, generally semi-spherical section 30. The sections are assembled at flanged joints 31 and 32 so as to provide an airtight structure. The conveyor feed tube 17 is mounted through the wall of the central section 29 as is the vent system tube 15.

A conventional plasma arc torch 35 is mounted through an inclined torch receptacle opening 36 provided in the central section. An access and viewing port 38 is also provided in the central section. A gas vent or outlet 40 is provided in the upper section 29 of the processing chamber. The gas vent system is designed to convey gas at a temperature of about 875° C.– 1000° C. to the gas quencher 65. The gas pipe 26 is designed to be airtight to prevent the hot gas from igniting. It is also refractory lined to maintain gas temperatures above about 875° C.

The lower section 30 of the processing chamber 20 includes a vitreous slag tap 42 which is controlled by a tap positioning system 43. The slag(s) forms a pool "S" in the lower section. The tap is of a suitable diameter to allow overflow tapping of the glassy slag. Metal residue, if it accumulates, can be tapped through a bottom tap 46, which allows the chamber to be emptied.

An injector 45 is also mounted in the upper section 29 of the processing chamber. The injector supplies oxygen, preferably in the form of steam, within the vessel, so as to regulate the products of pyrolysis as will be discussed in greater detail hereinbelow.

The plasma arc torch 35 emits a plasma flame which heats the interior of the processing chamber 20 to a uniform temperature preferably in the range of from about 1400° C.–1850° C. A non-transferred type torch is preferred for treating medical type waste being high in organics. In comparison to transferred type torches, non-transferred type torches offer the advantages of simpler mechanical control requirements as continual torch motion is not required, greater bulk gas heating capability, increased arc stability, especially during the heat up period, simplified furnace design, and overall greater system reliability.

The plasma heating system further includes a power supply, a plasma gas compressor and a cooling system (not shown).

Because the processing chamber 20 is constructed in sections, the replacement of those sections which are subject to greater wear and maintenance problems, such as the lower section, is facilitated at reduced cost and system downtime.

As illustrated in FIG. 2, the feed of material into the processing chamber from the feed tube 17 is such that the waste is introduced into the molten slag "S" which forms in the lower section 30, rather than being directly injected into the plasma flame "F". Introduction of the waste into the slag improves the capture of metals in the vitreous material and minimizes their entrainment into the effluent gas.

The waste processing system is designed to minimize surges of carbon particulate during the pyrolysis process. The system includes a process monitor and controls 50 (see FIG. 1) which includes a programmable logic controller having an imbedded microprocessor (not shown), and various controls and monitoring devices. This subsystem monitors process variables that are subsequently used to control other process variables to achieve the desired end product of the waste treating process. The system is designed to control the reformation of the organic compounds from the separated elemental components. This is achieved by controlling various process temperatures and pressures and also the injection of an oxidant into the processing chamber 20 to gasify any excess carbon so as to maximize the percentages of hydrogen and carbon monoxide, and minimize the percentages of carbon dioxide, carbon particulate, and reformed complex organic compounds, in the pyrolysis product gas stream.

The thermal decomposition (pyrolysis) of hydrocarbons releases solid carbon and hydrogen gas. Hydrocarbon derivatives also contain varying amounts of oxygen, nitrogen and halogens such as chlorine. Oxygen and chlorine are free to react with the abundant carbon and hydrogen and may theoretically reform a wide array of complex organic compounds. Such complex compounds cannot form at the high temperatures reached within the processing chamber at which only a limited number of simple compounds are stable. The most common and stable of these simple compounds are carbon monoxide and hydrogen chloride. There is normally an insufficient amount of oxygen liberated from the waste material to convert all of the solid carbon to carbon monoxide gas. As a result, fine carbon particulate is entrained and carried out of the processing chamber by the hydrogen dominated gas stream. Moisture in the waste liberates additional oxygen. But unless the waste moisture content is uniformly distributed throughout the waste and exceeds at least about 30% by weight, an additional source of oxygen is required to maximize this conversion.

The amount of oxygen added must be closely controlled, however, because if excessive oxygen is added into the process, combustion occurs and forms undesirable carbon dioxide. The amount of oxidant injected into the processing chamber is under process control. More particularly, it is determined by two monitoring systems; a first monitor 51 for monitoring the amount of carbon particulate entrained in the gas stream as it exits the processing chamber, and a second gas monitor 52 located proximate to the first monitor 51, or alternatively located downstream of the first monitor for monitoring the composition of the product gas.

In the processing chamber 20, organic waste decomposes rapidly to its stable basic constituents of mostly hydrogen gas, carbon monoxide, carbon particulate and possibly hydrogen chloride. The waste processing system includes means for injecting an oxidant into the processing chamber in an amount effective to convert a major portion of the carbon particulate to carbon monoxide. The injection means is preferably an oxidant supply system 53 which includes a steam generator 53' and a steam valve 54 which is opened in a controlled manner to supply steam to the injector 45 which injects predetermined amounts of steam into the processing chamber. The steam injected into the processing chamber converts the free carbon into primarily carbon monoxide. The carbon monoxide is a desirable end product because it has fuel value and can be combined with the hydrogen product to form a product gas which can be utilized by an energy recovery system 70. By limiting excess oxygen, the formation of metal oxides, nitrogen oxides and sulfur oxides are minimized.

The fuel gas product can, for example, be burned in a steam boiler, used to power fuel cells, reformed into methanol with catalytic converters, or used to power a turbine to produce electricity.

After the oxidant is injected into the processing chamber, turbulence is created in the chamber to thoroughly mix the carbon and steam to maximize gasification of the carbon. The processing chamber includes a turbulent region 47 (see FIG. 2) into which the oxidant is injected and through which the exiting gas and entrained carbon are forced to pass. The carbon and oxidant must remain in the turbulent region for an effective amount of time for the oxidation reaction to occur.

The residence time is the amount of time that the gas and entrained particulate and steam remain in the high temperature region of the processing chamber and the gas piping. Residence time is a function of the gas flow rate and the distance it travels. At the highest gas flow rate, the volume of the turbulent region and the gas piping that carries the gas to the quencher are such so as to ensure a sufficient residence time. The turbulent region improves the probability of reaction between carbon and oxygen without having to increase the chamber volume and residence time.

Figure 3:
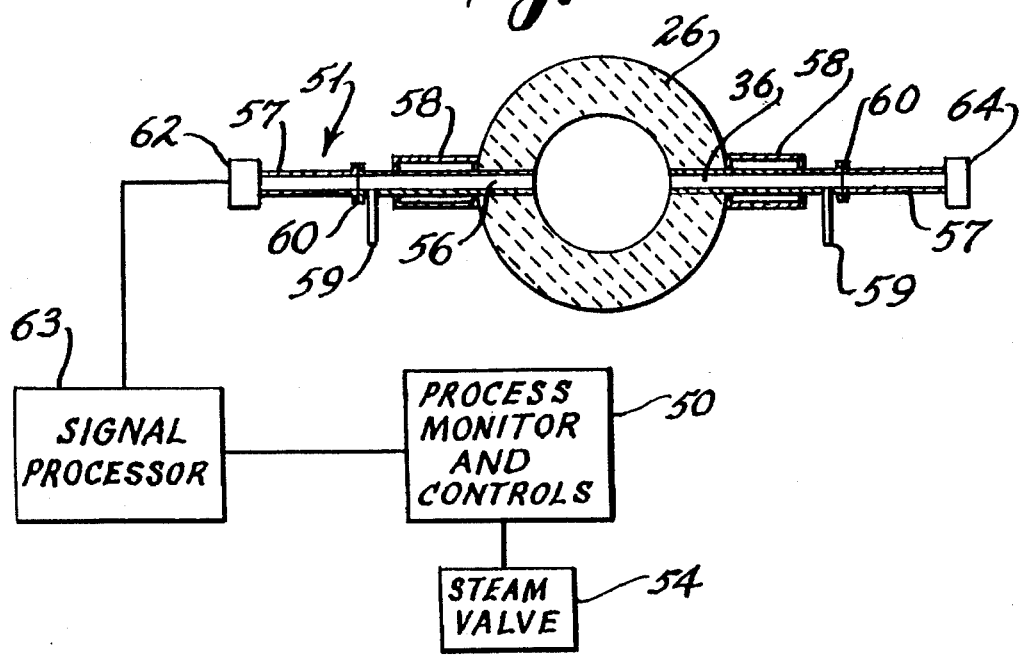
FIG. 3 is a partially schematic view of a particulate monitoring system of the apparatus in accordance with the invention.

The proper amount of oxidant injected into the processing chamber 20 is determined downstream and in the off-gas piping 26 by the first monitor 51 which measures the amount of free carbon in the gas stream as it exits the processing chamber. As illustrated in FIG. 3, the first monitor 51 preferably includes a tap having small viewing holes 56 in the refractory lining of the outlet gas piping 26 from the processing chamber. The viewing holes are fitted with stainless steel pipes 57, water-cooled jackets 58 surrounding the pipes, nitrogen purge ports 59, glass pressure windows 60, a light source 64 and a detector 62. The detector continuously monitors the gas leaving the processing chamber to measure carbon particulate.

The first monitor illustrated in FIG. 3 uses a light source 64 of a specified wavelength that travels across the gas pipe to the detector 62. The amount of light that reaches the detector is dependent on the density of particulate in the gas. The particulate causes scattering and dispersion of the light emitted from the light source.

The output from the detector 62 goes to a signal processor 63 connected to the process monitor and control 50 which includes means for controlling the amount of steam injected into the processing chamber. The controlling means preferably comprises a number of logic devices. The detector identifies surges of carbon particulate in the gas stream that follow the rapid decomposition of organic material and sends a corresponding signal to the signal processor, which processes the signal and directs it to the logic devices. The logic devices control the opening of the steam valve 54 to cause oxidant to be immediately injected into the processing chamber until an acceptable carbon particulate level has been restored.

The gas formed from the dissociation and partial oxidation of organic material is heated to at least about 900° C.–1150° C. in the processing chamber. The waste processing system comprises means for maintaining the temperature of the off-gas above a predetermined temperature until it reaches a means for cooling the off-gas to a temperature of less than about 150° C. and for separating a portion of the entrained carbon particulate from the cooled off-gas. The cooling means is preferably quencher 65. The off-gas is transported from the outlet port 40 of the processing chamber to the quencher through piping 26 which is thermally insulated to maintain the gas temperature above about 875° C. until it reaches the quencher. The quencher is preferably as close to the processing chamber as possible, in order to minimize heat loss and cooling until the gas is rapidly cooled below about 150° C. High temperature thermocouples monitor the gas temperature prior to the steam injection zone and downstream proximate to the inlet of the quencher.

Various operating parameters are used to maintain the gas temperature within the preferred operating range. The operating gas temperature inside the main chamber is a function of balancing the torch power input and the feed rate. The torch provides the necessary amount of heat to maintain a minimum bulk chamber temperature which determines the gas temperature. The waste absorbs heat energy as it is fed into the chamber. Because the torch power is primarily fixed by its size and operating parameters, the waste feed rate is used to prevent the chamber from overheating, and thereby to regulate the chamber temperature. Another parameter which influences temperature is the amount of combustion oxidation which occurs to form carbon dioxide. Allowing additional excess steam into the chamber allows a larger percentage of carbon to oxidize to carbon dioxide. This reaction is exothermic, and it releases additional heat which tends to raise temperature. In accordance with the invention, this reaction may be promoted to raise temperatures at the beginning of the waste treatment process; however, it lowers the fuel quality of the product gas and accordingly is not a preferred aspect of the process.

In the quencher 65, the gas is rapidly cooled with water sprays to a temperature of about 150° C. or less to prevent the formation of complex organic compounds. Recirculating water is sprayed as a very fine mist along the axis of the gas pipe that the gas moves through. As the hot gas contacts the spray, the quench water is quickly heated and evaporative cooling quickly lowers the gas temperature to prevent the reformation of complex organic molecules. The action of the sprays also washes out a portion of the carbon and metal particulate entrained in the gas. The particulate is removed by a particulate recycling system 66 and introduced into the feed system through conduit 67. The quench water is recirculated and reused.

After the gas is cooled by the quencher 65, it is drawn by the draft fan 19 into a means for neutralizing acidic gases in the cooled off-gas and for separating substantially the remaining portion of the carbon particulate therefrom so as to form a product gas. This means is preferably a wet gas scrubber 68. The chlorinated organic materials often found in hospital and other organic waste decompose and in the hydrogen rich gas, reform as hydrogen chloride. This compound is neutralized in the scrubber by reacting it with a basic neutralizing agent to form salts, as the pyrolysis gas travels through the scrubber.

The particulate that is washed out of the gas by the scrubber 68 are filtered out of the scrubber water by the particulate recycling system 66 and then dewatered and introduced into the feed system 10 through conduit 67 for further processing. A water handling system 72 supplies regulated amounts of makeup water and a neutralizing agent to the quencher 65 and scrubber 68 by way of a water supply 73 and a neutralizing agent supply 74, respectively. The water handling system also provides a discharge to a sewer 75.

After the cooled gas leaves the gas scrubber 68, it passes to the second gas monitor 52 which preferably comprises an on-line gas monitor for monitoring the composition of the product gas. The gas monitor includes a thermal conductivity analyzer 76 to measure the percentage of hydrogen, and infrared analyzers 77 to measure the percentages of carbon monoxide, carbon dioxide and methane, as a representative of the total hydrocarbons, in the scrubbed gas. The infrared analyzers provide a general measure of the proportions of carbon and oxygen in the process and this measure is used for monitoring overall process balance.

For example, the second gas monitor 52 can be used to determine if there are any air leaks in the system. Such leaks are indicated by low total percentages of hydrogen, carbon monoxide, carbon dioxide and methane. If air, being about 80% nitrogen, is leaking into the system, the total percentage of the four gases will be less than approximately 92–94%. The gas percentages also indicate that the system is operating properly.

As explained above, an objective of controlled pyrolysis is to convert the liberated carbon solids from the organic waste into carbon monoxide which has fuel value. If too much oxygen is present, combustion will occur and convert carbon into carbon dioxide which has no fuel value. The waste processing system in accordance with the invention achieves a balance between the amount of liberated carbon and the amount of oxygen permitted to react with it. Because pure carbon is more reactive at the high operating temperature than is carbon monoxide, additional oxygen injected into the chamber reacts with the carbon and forms additional carbon monoxide, and not with carbon monoxide to form carbon dioxide. Carbon dioxide is also relatively less stable at the processing temperatures than carbon monoxide.

The amount of carbon liberated when processing medical waste varies with the amount and type of organic materials fed into the processing chamber. Generally, the amount of oxidant needed to accomplish the desired gasification of the carbon can be determined by monitoring the percentages of carbon monoxide, carbon dioxide and methane in the product gas stream. As the waste composition in the feed varies, however, temporary, rapid changes occur in the amount of carbon liberated. Accordingly, an immediate adjustment in the amount of oxidant injected into the processing chamber is required to prevent accompanying surges in the amount of carbon exiting the processing vessel. This requirement mandates having a monitoring device, namely the first monitoring means 51, proximate to the processing chamber to measure carbon particulate at the high gas temperature and direct a timely response from the oxidant injection system to increase the amount of oxygen injected until the amount of free carbon has been reduced to an acceptable level.

The inorganic waste materials such as non-toxic metals, toxic heavy metals, ceramics and glasses melt in the processing chamber at a temperature of about 1650° C. The molten material formed is composed of glass-like slag and, in some instances, a metal layer, which are separable.

As explained above, the waste processing system includes means for removing the molten material from the processing chamber. Referring to FIG. 1, the removing means preferably comprises the tap device 42, a sealed water tank 80 and a solid residue handling system 81. The molten material passes through the tap device and into the sealed water tank, where the material is rapidly quenched and caused to fracture into smaller pieces. The solid glassy slag is essentially inert because the heavy metals are bound within it. Consequently, the glassy slag resists leaching in the solid state.

The orientation of the torch with respect to the interior chamber is such that the flame of the torch is directed to the area of the tap device 42. The increased heat transfer from the torch flame to the tap area (and the molten glass as its level reaches the tap hole) promotes a continuous flow of molten glass through the tap hole as the level of glass builds up from scrap glass and metals in the waste feed. If the tap area requires additional heating to start the flow of glass through the hole, the torch can be lowered so as to increase heat transfer directly to the tap area. The tap hole can be sealed during standby periods by a tap positioning device 43 which closes the tap hole to minimize heat loss. Over a period of time, a layer of metals may accumulate below the glassy slag. Certain metals such as iron do not react readily with the silicates. The glassy material absorbs some of these metals, but the metals may accumulate if a large amount is in the waste stream. This is not a serious problem, however, and if the metals eventually fill the basin, they can be drained through the bottom tap 46 and recycled as scrap metal. The bottom tap 46 is also sealed by the tap positioning device 43 and can be mechanically opened for draining.

The solid residue handling system 81 preferably includes a conveyor or other suitable device 82 for moving the solid slag to a bin 85 for transport and disposal.

The scrubbed gas is transported to an energy recovery system 70. Entrained moisture can be removed by conventional equipment if necessary. The gas formed from the thermal decomposition (pyrolysis) of organic materials is mainly hydrogen and carbon monoxide. This composition of gas is a usable fuel gas and can be used to recover the energy that was in the waste materials as described hereinabove.

The above-described waste processing system in accordance with the preferred embodiment of the invention overcomes a number of disadvantages of the known waste treating systems with respect to the complete and safe processing of substantially all medical related waste. More particularly, the waste processing system is able to process a wide variety of hazardous and non-hazardous, inorganic and organic, medical waste components, containing varying amounts of moisture, and simultaneously comply with all of the applicable air and water emissions standards. The plasma heating system maintains a constant high temperature in the processing chamber and controls the temperature of the off-gas to produce an end product containing minimal hazardous organic molecules. The waste processing system produces solid residues in the form of glass-contained metals which pass TCLP tests and accordingly can be recycled or reused. Further, the apparatus and method of the present invention are not limited to the safe disposal of hospital, medical and related toxic and hazardous waste but are also effective for use in the safe disposal of chemical toxins and the like.

It will be understood by those skilled in the art that the waste processing apparatus in accordance with the invention is suitable for treating waste material other than medical waste. For example, the waste may be paper waste and the like. For such non-hazardous and non-toxic types of waste, the apparatus may be modified to eliminate various components such as the disinfectant system, the airlock doors and the vent system, which are preferred for treating medical waste.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. An apparatus for treating waste consisting of inorganic and organic components, comprising:

a waste processing chamber;

means for continually feeding waste into said processing chamber at a controlled feed rate;

a plasma arc torch for heating said processing chamber to a sufficient temperature to convert organic components of the waste to a gas comprising hydrogen, carbon monoxide and carbon dioxide, and to particulate including carbon particulate, and to convert inorganic components of the waste substantially to molten material;

means for withdrawing gas from said processing chamber as an off-gas;

thermally insulated conduit means for maintaining the off-gas at an effective temperature to substantially prevent the formation of complex organic compounds;

means for removing said molten material from said processing chamber;

first monitoring means for monitoring the amount of carbon particulate entrained in the off-gas;

means for injecting an oxidant into said processing chamber in an amount effective to convert a majority of said carbon particulate to carbon monoxide;

means responsive to said first monitoring means for controlling the amount of oxidant injected into said processing chamber so as to minimize the formation of carbon particulate; and means for rapidly cooling the off-gas from said effective temperature to a temperature of less than about 150° C. and for separating the particulate from the cooled off-gas to form a product gas.

2. The apparatus of claim 1, wherein the feeding means comprises an auger surrounded by a cooled feed conveyor, and a motor for driving said auger at a controlled speed.

3. The apparatus of claim 2, wherein the feeding means further comprises a charging hopper into which waste is charged, a feed hopper positioned below said charging hopper, a first sliding door which allows charging of said charging hopper in an opened position and which forms a gas-tight cover for said charging hopper in a closed position, a second sliding door disposed between said charging hopper and said feed hopper which provides communication therebetween in an opened position and forms a divider therebetween in a closed position, said first and second doors being alternately openable, and said auger extending from said charging hopper and said conveyor extending to said processing chamber.

4. The apparatus of claim 1, wherein said molten material comprises molten metal and molten slag, said removing means comprises a first tap for draining said molten metal from said processing chamber and a second tap for draining said molten slag from said processing chamber, means for positioning said first and second taps, a cooling vessel in communication with said second tap for cooling the drained molten slag to form a non-leachable solid material, and means for conveying the solid material away from said cooling vessel.

5. The apparatus of claim 3, further comprising a fan for drawing the off-gas from said processing vessel and through the cooling means and the neutralizing means, and for maintaining a partial vacuum in said processing chamber.

6. The apparatus of claim 5, further comprising a vent system extending between said feed hopper and said processing chamber through which gas in said feed hopper vents into said processing chamber.

7. The apparatus of claim 3, further comprising a disinfecting system for injecting a disinfectant into said feed hopper, said disinfecting system including a spray nozzle mounted within said feed hopper above said auger, and means for connecting said spray nozzle to a disinfectant supply.

8. The apparatus of claim 1, wherein said first monitoring means comprises at least one viewing opening in said thermally insulated conduit means, and a detector mounted relative to said viewing opening for detecting the concentration of carbon particulate in the off-gas.

9. The apparatus of claim 8, further comprising a second monitoring means for measuring the percentage of hydrogen, carbon monoxide, carbon dioxide and a hydrocarbon gas in the product gas.

10. The apparatus of claim 9, wherein the oxidant is steam and the injecting means comprises a steam generator and a steam valve which is openable to inject steam into said processing chamber.

11. The apparatus of claim 10, further comprising a signal processor for receiving signals from said detector, and the controlling means controls the opening of said steam valve to inject steam into said processing chamber in controlled amounts in response to receiving signals from said signal processor indicating an excess amount of carbon particulate is entrained in the off-gas and receiving signals from said second gas monitoring means indicating an overall balance in carbon oxidation.

12. The apparatus of claim 11, wherein said waste processing chamber includes a turbulent region at which steam is injected.

13. The apparatus of claim 11, wherein said first monitoring means includes a pipe extending from said viewing opening in said thermally insulated conduit means and having an intermediate portion at an outer end, means for cooling said pipe, a glass pressure window mounted along said intermediate portion of said pipe, and said detector being mounted to said outer end of said pipe.

14. The apparatus of claim 1, further comprising an energy recovery system for recovering energy from the product gas.

15. The apparatus of claim 1, further comprising a first thermocouple disposed at said processing chamber and a second thermocouple disposed proximate to said cooling means.

16. A method for treating waste consisting of organic and inorganic components, comprising the steps of:

providing a waste processing vessel having a processing chamber;

feeding waste into said processing chamber at a controlled feed rate;

providing a plasma arc torch;

heating said waste in said processing chamber using said plasma arc torch to convert organic components of the waste to a gas comprising hydrogen, carbon monoxide and carbon dioxide, and to particulate including carbon particulate, and to convert inorganic components of the waste substantially to molten material, passing off-gas from said processing vessel through a thermally insulated conduit to maintain the off-gas at an effective temperature to substantially prevent the formation of complex organic compounds;

removing said molten material from said processing chamber;

monitoring the amount of carbon particulate entrained in the off-gas using a first monitor;

injecting an oxidant into said processing chamber in an amount effective to convert a majority of said carbon particulate to carbon monoxide;

rapidly cooling the off-gas from said effective temperature to a temperature of less than about 150° C.;

separating the particulate from the cooled off-gas so as to form a product gas comprised of from about 45% to about 55% of hydrogen and from about 30% to about 40% of carbon monoxide; and monitoring the composition of the product gas using a second gas monitor.

17. The method of claim 16, wherein the step of feeding comprises grinding and mixing solids and liquids in the waste and thereafter delivering the waste into the processing chamber.

18. The method of claim 17, wherein said step of feeding includes introducing the waste into a first collection means, closing said first collection means to the surrounding environment, discharging the waste into a second collection means, closing said second collection means to said first collection means and the surrounding environment, and thereafter grinding and mixing solids and liquids in the waste.

19. The method of claim 16, wherein the step of removing comprises draining molten slag from said processing chamber through a tap, cooling the drained molten slag in a cooling vessel in communication with said tap to form a non-leachable solid material, and conveying the solid material away from said cooling vessel.

20. The method of claim 16, wherein the first monitor measures the amount of particulate in the off-gas.

21. The method of claim 20, wherein the second gas monitor comprises means for measuring the percentages of hydrogen carbon monoxide, carbon dioxide and a hydrocarbon gas in the product gas.

22. The method of claim 16, wherein the step of injecting comprises generating steam and injecting controlled amounts of the steam into said processing chamber through a selectively openable steam valve.

23. The method of claim 22, wherein steam is injected into said processing chamber in response to said first monitor indicating an excess amount of carbon particulate being entrained in the off-gas and said second gas monitor indicating a process balance of hydrogen, carbon monoxide, carbon dioxide and hydrocarbons in the product gas.

24. The method of claim 23, further comprising the step of mixing the carbon particulate and injected oxidant together at a turbulent region of said waste processing chamber for an amount of time effective to achieve substantially complete conversion of the carbon particulate to carbon monoxide.

25. The method of claim 16, further comprising the step of recovering energy from the product gas.

26. The method of claim 16, further comprising the step of maintaining a vacuum pressure in said processing chamber.

27. The method of claim 26, in which said step of feeding includes introducing the waste into a first collection means, closing said first collection means to the surrounding environment, discharging the waste into a second collection means, closing said second collection means to said first collection means and the surrounding environment, thereafter grinding and mixing solids and liquids in the waste, and venting gas from said second collection means into said processing chamber.

28. The method of claim 16, wherein the thermally insulated conduit extends between an exit port of said processing chamber and an inlet port of the cooling means, and further comprising detecting the temperature of the off-gas at said exit port and at said inlet port.

29. The method of claim 16, wherein the step of feeding comprises feeding medical waste into said processing chamber at a controlled feed rate.

30. An apparatus for treating toxic and hazardous medical waste consisting of inorganic and organic components, comprising:

a waste processing chamber;

a first collection means for receiving a charge of waste, first sealing means for closing said first collection means to the surrounding environment so as to isolate the charge of waste therein, a second collection means for receiving waste from said first collection means, second sealing means for closing said second collection means to said first collection means and the surrounding environment so as to isolate a charge of waste received therein;

conveyor means for continually feeding waste to said processing chamber at a controlled feed rate;

means for applying a vacuum pressure within said processing chamber;

means for venting said second collection means to said processing chamber;

a plasma arc torch mounted within said processing chamber for heating said waste to convert organic components of the waste to a gas comprising hydrogen, carbon monoxide and carbon dioxide, and to particulate including carbon particulate, and to convert inorganic components of the waste substantially to molten material, the gas exiting said processing vessel as an off-gas;

thermally insulated conduit means for maintaining the off-gas at an effective temperature to substantially prevent the formation of complex organic compounds;

an oxidant supply system for injecting an oxidant into said processing chamber in an amount effective to convert a majority of said carbon particulate to carbon monoxide;

a control system for controlling the amount of oxidant injected into said processing chamber so as to minimize the formation of carbon particulate; and cooling means for rapidly cooling the off-gas from said effective temperature to a temperature of less than about 150° C. and for separating the particulate from the cooled off-gas to form a product gas.

31. The apparatus of claim 30, including a gate means for closing said conveyor means to said processing chamber, and means for cooling said conveyor means.

32. The apparatus of claim 30, further comprising a first monitoring means disposed between said processing chamber and said cooling means for detecting the amount of carbon particulate entrained in the off-gas and means for connecting said first monitoring means to said control system, and a second gas monitoring means for monitoring the composition of the product gas.

33. The apparatus of claim 32, wherein said effective temperature is at least about 875° C. and the thermally insulated conduit means extends between an exit port of said processing chamber and an inlet port of said cooling means.

34. The apparatus of claim 30, including a disinfecting system for injecting a disinfectant into said feed hopper, said disinfecting system including a spray nozzle mounted within said feed hopper above said conveyor means, and means for connecting said spray nozzle to a disinfectant supply.

35. The apparatus of claim 30, wherein said processing chamber includes upper, intermediate and lower sections, means for assembling said sections in airtight relationship with respect to one another, and a first tap for draining molten metal and a second tap for draining molten slag from said processing chamber, said first and second taps being mounted in a spaced relationship through said bottom section.

36. A method for treating waste consisting of organic and inorganic components, comprising the steps of:

feeding waste into a first collection means and closing said first collection means to the surrounding environment, discharging the waste from said first collection means to a second collection means, and closing said second collection means to said first collection means and the surrounding environment;

conveying the waste at a controlled rate into a processing chamber;

heating said processing chamber using a plasma arc torch to a temperature effective to convert organic components of the waste to a gas comprising hydrogen, carbon monoxide and carbon dioxide, and particulate including carbon particulate, and to convert inorganic components of the waste substantially to molten material;

maintaining the processing chamber under vacuum to withdraw the gas exiting said processing vessel as an off-gas;

passing the off-gas from the processing chamber through a thermally insulated conduit to maintain the off-gas at an effective temperature to substantially prevent the formation of complex organic compounds;

removing said molten material from said processing chamber, and cooling the removed molten material to form a non-leachable solid material;

monitoring the amount of carbon particulate entrained in the off-gas;

injecting an oxidant into said processing chamber in an amount effective to convert a majority of said carbon particulate to carbon monoxide and to minimize the formation of carbon particulate;

rapidly cooling the off-gas from said effective temperature to a temperature of less than about 150° C.; and neutralizing acidic gases in the cooled off-gas to form a product gas.

37. The method of claim 36, comprising venting said second collection means to said processing chamber.

38. The method of claim 36, further comprising the step of introducing a disinfectant into said second collection means when said second collection means is closed to said first collection means.

39. The method of claim 36, wherein the step of feeding comprises feeding medical waste into said first collection means.

\* \* \* \* \*